United States Patent
Lee et al.

(10) Patent No.: US 12,488,518 B2
(45) Date of Patent: Dec. 2, 2025

(54) MAGNETIC RESONANCE IMAGE PROCESSING APPARATUS AND METHOD USING ARTIFICIAL NEURAL NETWORK IN K-SPACE DOMAIN

(71) Applicant: AIRS MEDICAL INC., Seoul (KR)

(72) Inventors: Jingu Lee, Seoul (KR); Jeewook Kim, Seoul (KR); Sunwoo Kim, Seoul (KR); Keunwoo Jeong, Seoul (KR); Jaeyeon Yoon, Gyeonggi-do (KR)

(73) Assignee: AIRS MEDICAL INC., Seoul (KR)

( * ) Notice: Subject to any disclaimer, the term of this patent is extended or adjusted under 35 U.S.C. 154(b) by 324 days.

(21) Appl. No.: 17/275,712

(22) PCT Filed: Jan. 15, 2021

(86) PCT No.: PCT/KR2021/000594
§ 371 (c)(1),
(2) Date: Jun. 28, 2023

(87) PCT Pub. No.: WO2022/124473
PCT Pub. Date: Jun. 16, 2022

(65) Prior Publication Data
US 2023/0326099 A1    Oct. 12, 2023

(30) Foreign Application Priority Data
Dec. 10, 2020 (KR) .................. 10-2020-0172052

(51) Int. Cl.
*G06T 11/00* (2006.01)

(52) U.S. Cl.
CPC .......... *G06T 11/008* (2013.01); *G06T 11/005* (2013.01); *G06T 11/006* (2013.01);
(Continued)

(58) Field of Classification Search
CPC .... G06T 11/008; G06T 11/005; G06T 11/006; G06T 2207/10088; G06T 2207/20084;
(Continued)

(56) References Cited

U.S. PATENT DOCUMENTS

2019/0369190 A1*  12/2019  Ye ......................... G01R 33/56
2019/0369191 A1   12/2019  Gong et al.

FOREIGN PATENT DOCUMENTS

| KR | 10-2019-0038333 A | 4/2019 |
| KR | 10-2019-0133728 A | 12/2019 |
| KR | 10-2019-0138107 A | 12/2019 |

OTHER PUBLICATIONS

Kinam Kwon, A parallel MR imaging method using multilayer perceptron, Medical Physics, 44, 12, Oct. 23, 2017, pp. 6209-6211.
(Continued)

*Primary Examiner* — Jianxun Yang
(74) *Attorney, Agent, or Firm* — Harness, Dickey & Pierce, P.L.C.

(57) ABSTRACT

According to an embodiment of the present invention, there is provided a magnetic resonance image processing method that is performed by a magnetic resonance image processing apparatus, the magnetic resonance image processing method including: acquiring first k-space data calculated based on a sub-sampled magnetic resonance signal; acquiring second k-space data from the first k-space data by using a first artificial neural network model; and acquiring a first magnetic resonance image from the second k-space data by using an inverse Fourier operation.

16 Claims, 17 Drawing Sheets

(52) U.S. Cl.
CPC ............... *G06T 2207/10088* (2013.01); *G06T 2207/20084* (2013.01); *G06T 2207/30004* (2013.01); *G06T 2210/41* (2013.01); *G06T 2211/40* (2013.01)

(58) Field of Classification Search
CPC ....... G06T 2207/30004; G06T 2210/41; G06T 2211/40; A61B 5/00; A61B 5/055; A61B 5/0033; A61B 5/7257; G01R 33/56; G01R 33/5608; G06N 3/08; G06N 20/00; G16H 30/20; G16H 30/40
See application file for complete search history.

(56) References Cited

OTHER PUBLICATIONS

International Search Report from corresponding PCT Application No. PCT/KR2021/000594, dated Sep. 6, 2021.
Written Opinion from corresponding PCT Application No. PCT/KR2021/000594, dated Sep. 6, 2021.
Ding, K., et al.; "Comparison of Full-Reference Image Quality Models for Optimization of Image Processing Systems", optimizaarXiv: 2005.01338v3 [eess.IV], Dec. 8, 2020, pp. 1-25.
Chang Min Hyun et al "Deep learning for undersampled MRI reconstruction" 2018 Phys. Med. Biol. 63 135007.
Ran, M., et al.; "MD-Recon-Net: A Parallel Dual-Domain Convolutional Neural Network for Compressed Sensing MRI", pp. 1-17.

* cited by examiner

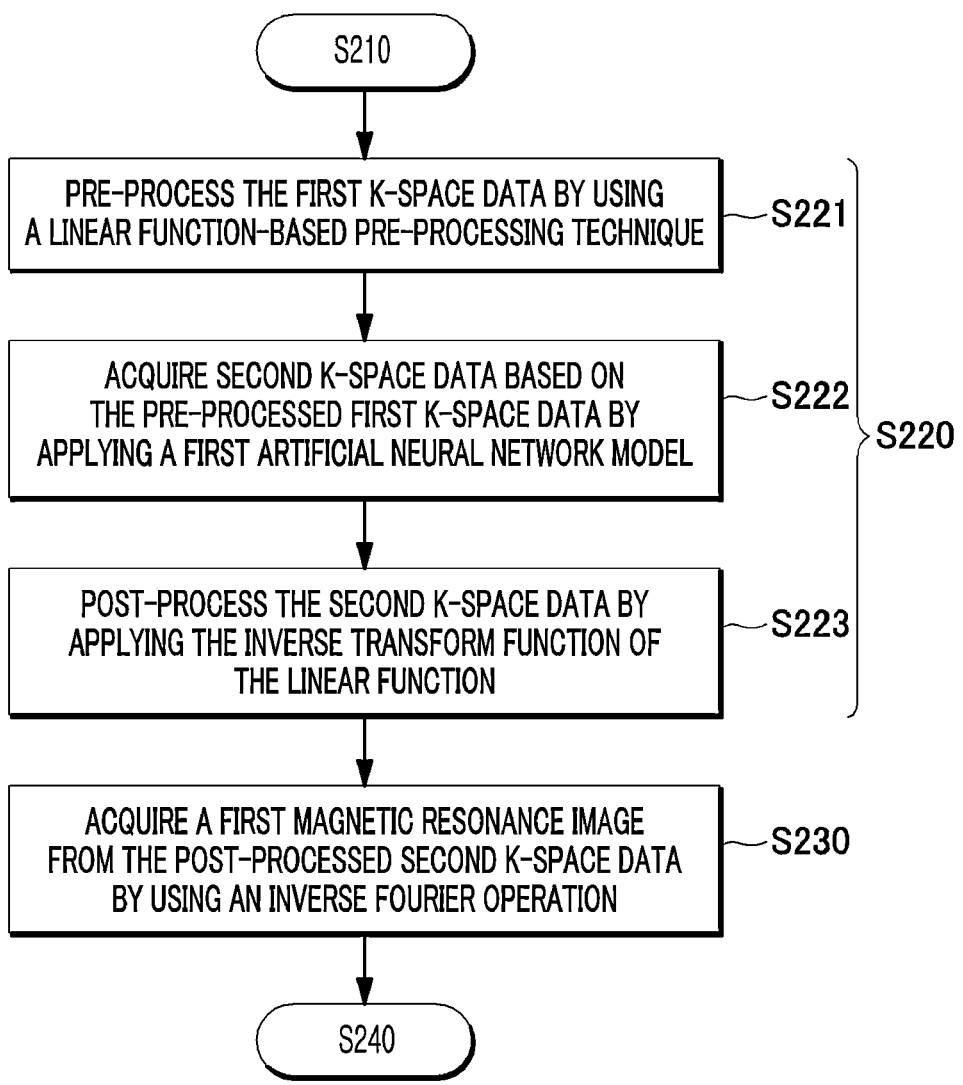

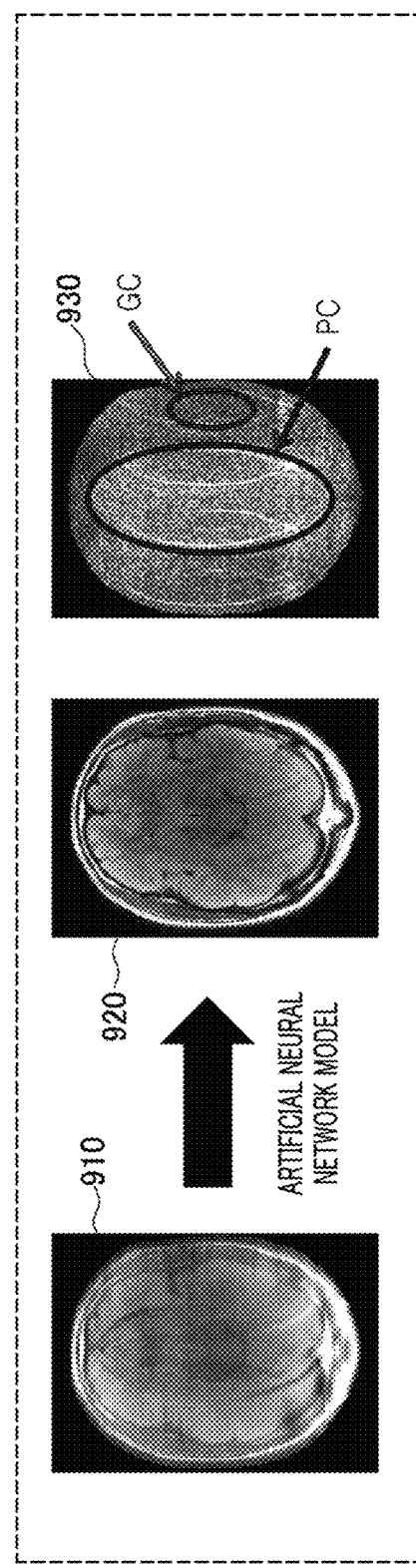

16ch coil sensitivity map

INITIAL DATA DISTRIBUTION RESCALED DATA DISTRIBUTION

MAGNETIC RESONANCE IMAGE PROCESSING APPARATUS AND METHOD USING ARTIFICIAL NEURAL NETWORK IN K-SPACE DOMAIN

CROSS-REFERENCE TO RELATED APPLICATIONS

This application is a national phase application of PCT Application No. PCT/KR2021/000594, filed on 15 Jan. 2021, which claims the benefit of and priority to Korean Patent Application No. 10-2020-0172052, filed on 10 Dec. 2020. The entire disclosures of the applications identified in this paragraph are incorporated herein by references.

TECHNICAL FIELD

The present invention relates to a magnetic resonance image processing apparatus and method, and more particularly to a magnetic resonance image processing apparatus and method that accelerate the acquisition of magnetic resonance images from a magnetic resonance signals using an artificial neural network.

BACKGROUND ART

In general, medical imaging machines are apparatuses that acquire information about the body of a patient and provide an image. Medical imaging machines include an X-ray machine, an ultrasound diagnostic scanner, a computed tomography machine, and a magnetic resonance imaging (MRI) machine.

A magnetic resonance image is an image acquired by imaging the density and physical/chemical properties of atomic nuclei by generating nuclear magnetic resonance in the atomic nuclei nucleus of hydrogen in the human body using a magnetic field and non-ionizing radiation that are harmless to the human body. Magnetic resonance imaging machines occupy an important position in the field of diagnosis using medical images because the imaging conditions thereof are relatively free, the images thereof include various types of diagnostic information from soft tissues, and the machines provide images having excellent contrast.

Meanwhile, the imaging performed by such magnetic resonance imaging machines may take time ranging from about 20 minutes to about 1 hour depending on an imaging target region and the type of magnetic resonance image. In other words, a drawback arises in that the imaging time of the magnetic resonance imaging machines is longer than those of other types of medical imaging machines. This drawback may impose a burden regarding imaging on a patient. In particular, the drawback makes it difficult to apply magnetic resonance imaging to a patient with claustrophobia. Therefore, technologies for shortening the imaging time have been developed until recently, and also, there is a demand for improvement in image quality.

SUMMARY

Technical Problem

A magnetic resonance image processing apparatus and method according to the present invention is intended to overcome the deterioration of the quality of a magnetic resonance image caused by shortening the time required for capturing a magnetic resonance image, thereby providing a magnetic resonance image having improved quality.

Technical Solution

According to an embodiment of the present invention, there is provided a magnetic resonance image processing method that is performed by a magnetic resonance image processing apparatus, the magnetic resonance image processing method including: acquiring first k-space data calculated based on a sub-sampled magnetic resonance signal; acquiring second k-space data from the first k-space data by using a first artificial neural network model; and acquiring a first magnetic resonance image from the second k-space data by using an inverse Fourier operation.

In the present embodiment, there may be provided the magnetic resonance image processing method, further including acquiring a second magnetic resonance image from the data of the first magnetic resonance image by using a second artificial neural network model.

In the present embodiment, there may be provided the magnetic resonance image processing method, wherein when the first k-space data is input to the first artificial neural network model, the acquired first magnetic resonance image includes a multi-domain artifact, and the multi-domain artifact is generated when an artificial neural network model is applied to k-space data.

In the present embodiment, there may be provided the magnetic resonance image processing method, wherein the multi-domain artifact includes at least any one of an aliasing artifact, a gibbs-ringing artifact, a white-dot artifact, a smoothing artifact, a texture artifact, and a hallucination artifact.

In the present embodiment, there may be provided the magnetic resonance image processing method, wherein when the first magnetic resonance image includes a plurality of multi-domain artifacts, the individual artifacts are arranged in a phase encoding direction.

In the present embodiment, there may be provided the magnetic resonance image processing method, wherein when the first k-space data is pre-processed and input to the first artificial neural network model and the second k-space data output from the first artificial neural network model is post-processed, the first magnetic resonance image acquired from the post-processed second k-space data does not include a multi-domain artifact.

In the present embodiment, there may be provided the magnetic resonance image processing method, wherein the pre-processing of the first k-space data is performed using a linear function-based pre-processing technique applied to the first k-space data.

In the present embodiment, there may be provided the magnetic resonance image processing method, wherein the post-processing of the first magnetic resonance image is performed using the inverse transform function of the linear function.

In the present embodiment, there may be provided the magnetic resonance image processing method, wherein coefficients included in the linear function are calculated based on at least any one of the first k-space data, the second k-space data, and the data of the first magnetic resonance image.

According to an embodiment of the present invention, there is provided a magnetic resonance image processing method that is performed by a magnetic resonance image processing apparatus, the magnetic resonance image processing method including: acquiring first k-space data calculated based on a sub-sampled magnetic resonance signal; acquiring a first magnetic resonance image from the first k-space data by using an inverse Fourier operation; and acquiring a second magnetic resonance image from data of the first magnetic resonance image by using a second artificial neural network model; wherein when the data of the first magnetic resonance image is input to the second artificial neural network model, the acquired second magnetic resonance image includes a multi-domain artifact, and the multi-domain artifact is generated when an artificial neural network model is applied to k-space data.

In the present embodiment, there may be provided the magnetic resonance image processing method, wherein the multi-domain artifact includes at least any one of an aliasing artifact, a gibbs-ringing artifact, a white-dot artifact, a smoothing artifact, a texture artifact, and a hallucination artifact.

In the present embodiment, there may be provided the magnetic resonance image processing method, wherein when the second magnetic resonance image includes a plurality of multi-domain artifacts, the individual artifacts are arranged in a phase encoding direction.

In the present embodiment, there may be provided the magnetic resonance image processing method, wherein when data of the first magnetic resonance image is pre-processed and input to the second artificial neural network model and the second magnetic resonance image output from the second artificial neural network model is post-processed, the post-processed second magnetic resonance image does not include a multi-domain artifact.

In the present embodiment, there may be provided the magnetic resonance image processing method, wherein the pre-processing of the data of the first magnetic resonance image is performed using a linear function-based pre-processing technique applied to the data of the first magnetic resonance image.

In the present embodiment, there may be provided the magnetic resonance image processing method, wherein the post-processing of the second magnetic resonance image is performed using the inverse transform function of the linear function.

In the present embodiment, there may be provided the magnetic resonance image processing method, wherein coefficients included in the linear function are calculated based on at least any one of the first k-space data, the second k-space data, and the data of the first magnetic resonance image.

According to an embodiment of the present invention, there is provided a magnetic resonance image processing apparatus for performing a magnetic resonance image processing method, the magnetic resonance image processing apparatus including: memory configured such that a magnetic resonance image processing program is stored therein; and a processor configured to execute the program; wherein the processor, in response to the execution of the program, acquires first k-space data calculated based on a sub-sampled magnetic resonance signal, acquires second k-space data from the first k-space data by using a first artificial neural network model, and acquires a first magnetic resonance image from the second k-space data by using an inverse Fourier operation.

According to an embodiment of the present invention, there is provided a magnetic resonance image processing apparatus for performing a magnetic resonance image processing method, the magnetic resonance image processing apparatus including: memory configured such that a magnetic resonance image processing program is stored therein; and a processor configured to execute the program; wherein the processor, in response to the execution of the program, acquires first k-space data calculated based on a sub-sampled magnetic resonance signal, acquires a first magnetic resonance image from the first k-space data by using an inverse Fourier operation, and acquires a second magnetic resonance image from data of the first magnetic resonance image by using a second artificial neural network model; and wherein when the first magnetic resonance image data is input to the second artificial neural network model, the acquired second magnetic resonance image includes a multi-domain artifact, and the multi-domain artifact is generated when an artificial neural network model is applied to k-space data.

Advantageous Effects

The magnetic resonance image processing apparatus and method according to the present invention provide the magnetic resonance image processing apparatus and method capable of acquiring a high-quality reconstructed image even when shortening the time required for capturing a magnetic resonance image, thereby facilitating the diagnosis of a lesion region of a patient.

Furthermore, the magnetic resonance image processing apparatus and method according to the embodiments of the present invention are configured to acquire magnetic resonance images from k-space data and to provide an output magnetic resonance image having high accuracy reconstructed by using the first artificial neural network model and the second artificial neural network model, thereby providing the effect of facilitating the diagnosis of a lesion region of a patient.

BRIEF DESCRIPTION OF THE DRAWINGS

FIG. 8 is a flowchart showing the flow of a magnetic resonance image processing method to which the pre-processing of first k-space data and the post-processing of second k-space data are applied according to an embodiment of the present invention;

FIGS. 10A and 10B are a diagram illustrating a noise pattern map among a plurality of sub maps according to an embodiment of the present invention;

DETAILED DESCRIPTION

Figure 1:
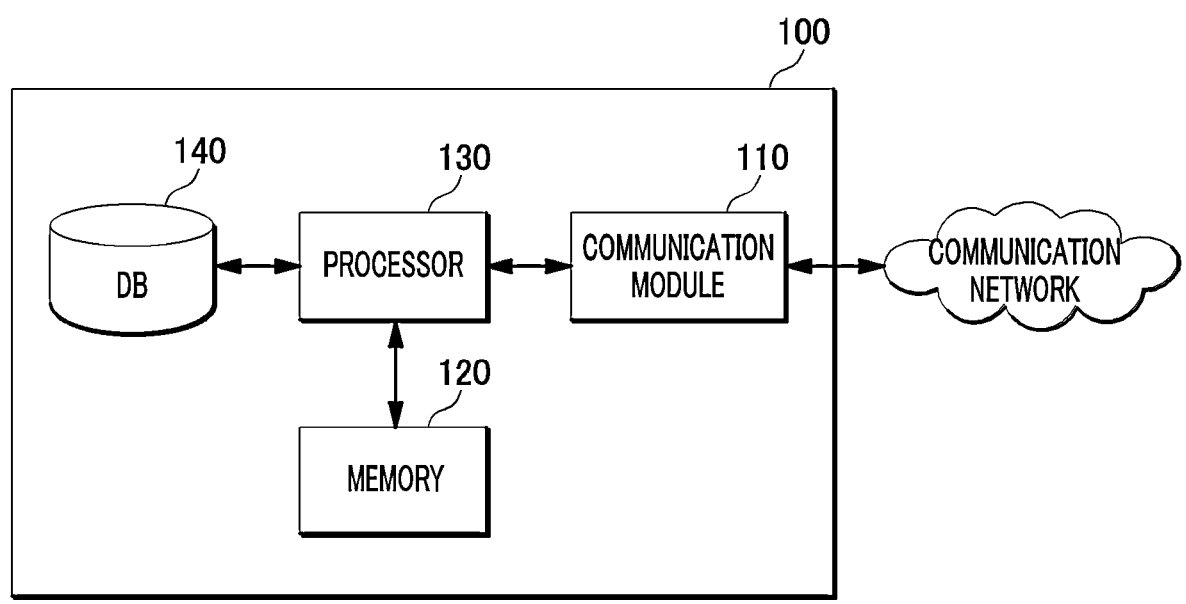
FIG. 1 is a block diagram showing the configuration of a magnetic resonance image processing apparatus according to an embodiment of the present invention.

Hereinafter, embodiments of the present invention will be described in detail with reference to the accompanying drawings so that those of ordinary skill in the art to which the present invention pertains may easily implement the present invention. However, the present invention may be implemented in various different forms, and is not limited to the embodiments described herein. Furthermore, in the drawings, portions not related to the description for the clear description of the present invention are omitted, and like reference numerals are assigned to like portions throughout the specification.

The specification does not describe all elements of the embodiments, and descriptions common in the art to which the present invention pertains or overlap descriptions between embodiments are omitted. The term 'unit' used therein may be implemented as software or hardware. According to embodiments, a plurality of 'units' may be implemented as a single element or one 'unit' may include a plurality of elements.

In the present specification, the 'image' may refer to multi-dimensional data composed of discrete image elements (e.g., pixels in a 2D image or voxels in a 3D image). For example, an image may include medical images acquired by medical imaging machines such as a magnetic resonance imaging machine, a computed tomography (CT) machine, an ultrasonic machine, and an X-ray machine.

In the present specification, the 'object' is an imaging target, and may include a human, an animal, or a part thereof. For example, an object may include a part (organ) of the body or a phantom. The phantom refers to a volume material having a density and an effective atomic number considerably close to those of an organism, and may include a spherical phantom having properties similar to the body.

A Magnetic Resonance Image (MRI) system is a system that acquires images of tomographic areas of an object by representing the intensity of a magnetic resonance (MR) signal for a radio frequency (RF) signal generated from a magnetic field of a specific intensity in the form of contrasts between light and darkness.

The MRI system allows a main magnet to form a static magnetic field, and aligns the magnetic dipole moment direction of a specific atomic nucleus of an object, located in the static magnetic field, in the direction of the static magnetic field. A gradient magnetic field coil may generate a gradient magnetic field by applying a gradient signal to the static magnetic field, thereby inducing a different resonance frequency for each portion of the object. An RF coil may radiate a magnetic resonance signal in accordance with the resonance frequency of a portion where an image is to be acquired. Furthermore, as the gradient magnetic field is formed, the RF coil may receive magnetic resonance signals of different resonance frequencies radiated from various portions of the object. The MRI system acquires an image by applying an image reconstruction technique to the magnetic resonance signals received through this step. In addition, the MRI system may reconstruct a plurality of magnetic resonance signals into image data by performing serial or parallel signal processing on the plurality of magnetic resonance signals received by multi-channel RF coils.

A magnetic resonance image processing apparatus according to an embodiment of the present invention will be described below.

The magnetic resonance image processing apparatus according to the embodiment of the present invention relates to a magnetic resonance image processing apparatus that is applied directly/indirectly to the above-described MRI system and accelerates the acquisition of a magnetic resonance image from a magnetic resonance signal.

The magnetic resonance image processing apparatus may include not only an MRI system capable of acquiring a magnetic resonance image by detecting a magnetic resonance signal by itself, but also an image processing apparatus for processing an image acquired from the outside and a smartphone, a tablet personal computer (PC), a PC, a smart TV, a micro-server, other home appliances, and other mobile or non-mobile computing devices equipped with a processing function for a magnetic resonance image, but is not limited thereto. In addition, the magnetic resonance image processing apparatus may be a wearable device, such as a watch, glasses, a hairband, or a ring, equipped with a communication function and a data processing function FIG. 1 is a block diagram showing the configuration of the magnetic resonance image processing apparatus according to the embodiment of the present invention.

Referring to FIG. 1, the magnetic resonance image processing apparatus may include a communication module 110, memory 120, a processor 130, and a database (DB) 140.

The communication module 110 provides a communication interface to the magnetic resonance image processing apparatus in conjunction with a communication network. The communication module 110 may serve to transmit and receive data to and from an MRI machine, a user terminal, and a management server. In this case, the communication module may be a device including hardware and software necessary to transmit and receive signals, such as control signals or data signals, to and from other network devices over a wired/wireless connection.

The memory 120 may be a storage medium in which a magnetic resonance image processing program is recorded. In addition, the memory 120 may perform the function of temporarily or permanently storing data that is processed by the processor. In this case, although the memory 120 may include volatile storage media or nonvolatile storage media, the scope of the present invention is not limited thereto.

The processor 130 may control an overall process that is performed by the magnetic resonance image processing program in the magnetic resonance image processing apparatus. The individual steps of a process that is performed by the processor 130 will be described later with reference to FIGS. 2 to 17.

In this case, the processor 130 may include all types of devices capable of processing data, such as a processor. In this case, for example, the 'processor' may refer to a data processing device embedded in hardware, which has a circuit physically structured to perform functions represented by code or instructions included in a program. Although as an example of the data processing device embedded in hardware as described above, there may be enumerated processing devices such as a microprocessor, a central processing unit (CPU), a processor core, a multiprocessor, an application-specific integrated circuit (ASIC), and a field-programmable gate array (FPGA), the scope of the present invention is not limited thereto.

The database 140 may be a device in which there are stored various types of data necessary for the magnetic resonance image processing apparatus to execute a program. For example, the database may be a device in which there are stored training data of an artificial neural network, magnetic resonance signal data, k-space data, and magnetic resonance image data to be described later.

Meanwhile, in the present invention, the 'terminal' may be a wireless communication device with guaranteed portability and mobility, and may be all types of handheld-based wireless communication devices such as a smartphone, a tablet PC, or a notebook. In addition, the 'terminal' may be a wearable device, such as a watch, glasses, a hairband or a ring, equipped with a communication function and a data processing function. In addition, the 'terminal' may be a wired communication device, such as a PC, that can be connected to another terminal or a server over a network.

Furthermore, the network refers to a connection structure in which information can be exchanged between individual nodes such as terminals and servers, and includes a local area network (LAN), a wide area network (WAN), the Internet (the World Wide Web (WWW), a wired/wireless data network, a telephone network, a wired/wireless television network, etc. Although examples of the wireless data network include 3G, 4G, 5G, 3rd Generation Partnership Project (3GPP), Long Term Evolution (LTE), World Interoperability for Microwave Access (WIMAX), Wi-Fi, Bluetooth communication, infrared communication, ultrasonic communication, Visible Light Communication (VLC), and LiFi networks are included, they are not limited thereto.

A magnetic resonance image processing method performed by the magnetic resonance image processing apparatus according to an embodiment of the present invention will be described in detail below.

Figure 2:
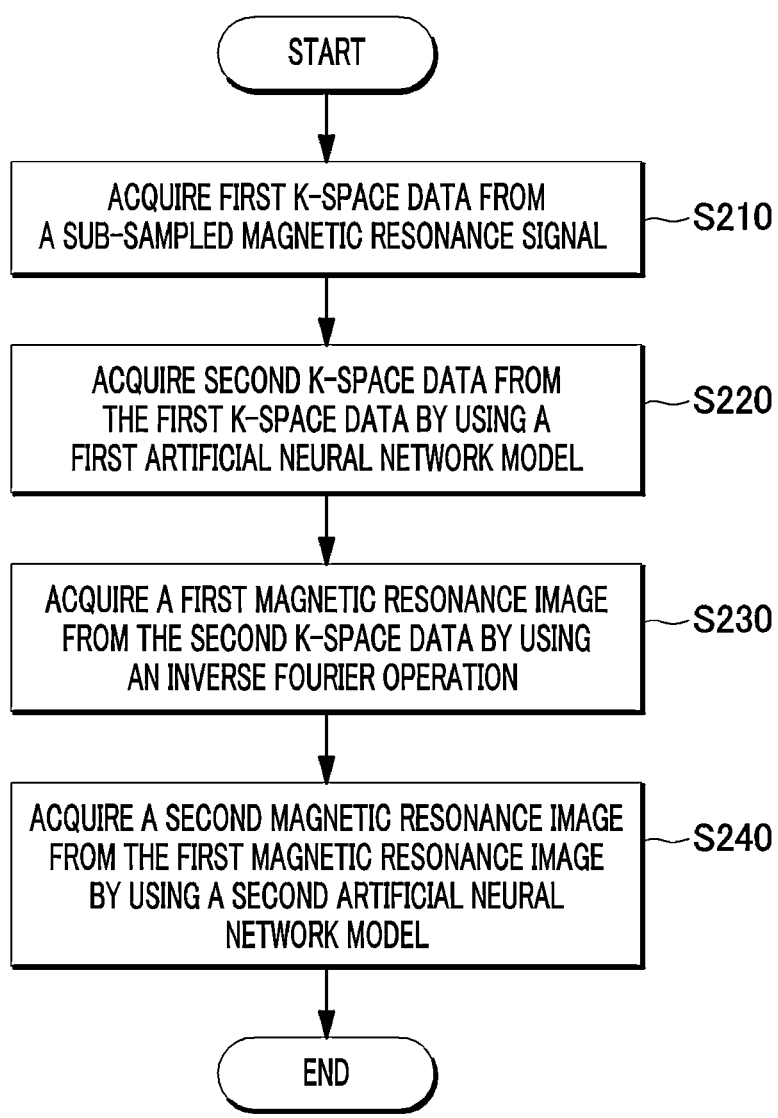
FIG. 2 is a flowchart showing the flow of a magnetic resonance image processing method according to an embodiment of the present invention.
Figure 3:
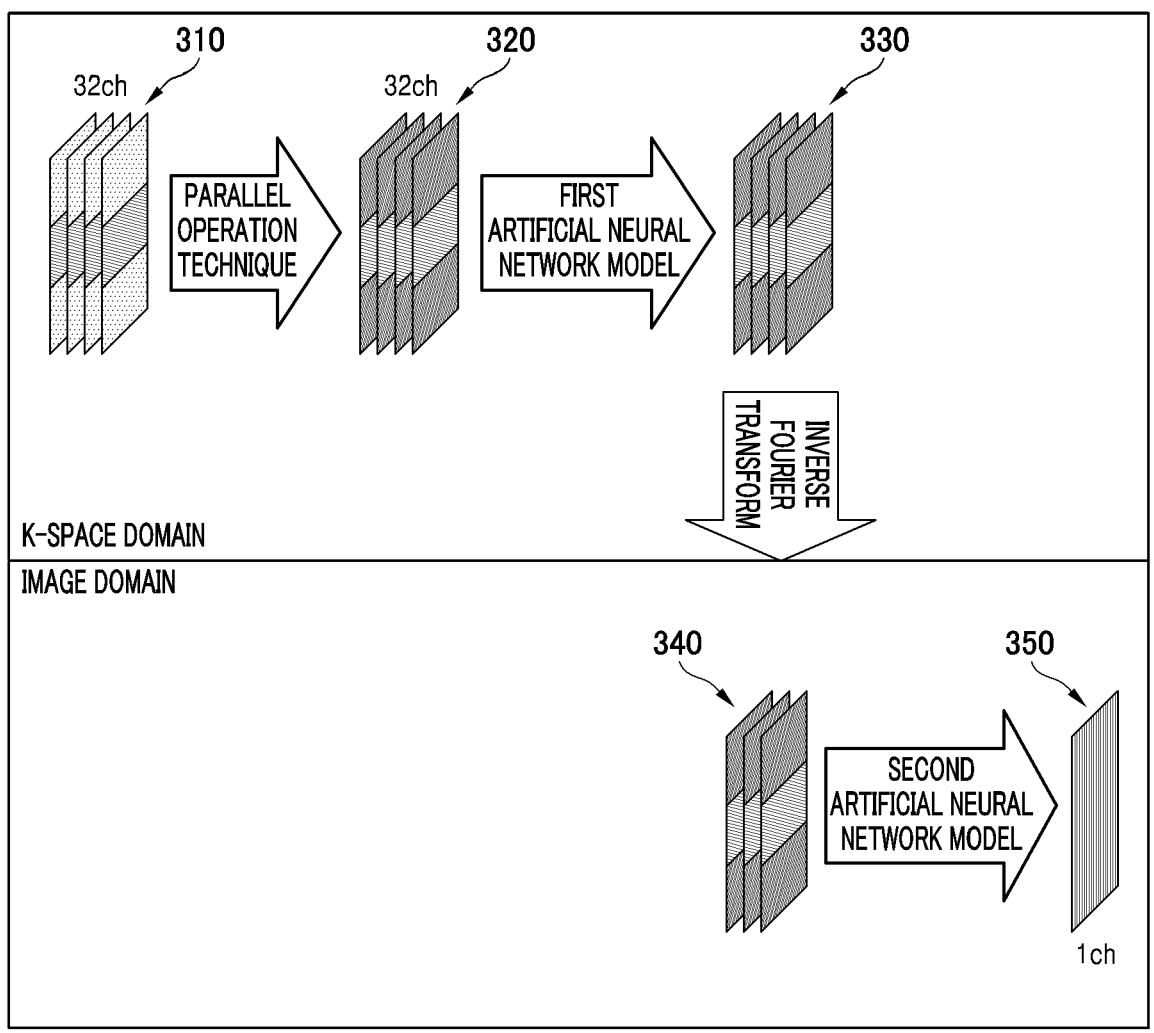
FIG. 3 is a schematic diagram showing the magnetic resonance image processing method according to the embodiment of the present invention.

FIG. 2 is a flowchart showing the flow of the magnetic resonance image processing method according to the embodiment of the present invention. FIG. 3 is a schematic diagram showing the magnetic resonance image processing method according to the embodiment of the present invention.

Referring to FIGS. 2 and 3, in the magnetic resonance image processing method performed by the magnetic resonance image processing apparatus according to the embodiment of the present invention, first, the step (not shown) of acquiring a sub-sampled magnetic resonance signal 310 may be performed.

Figure 4:
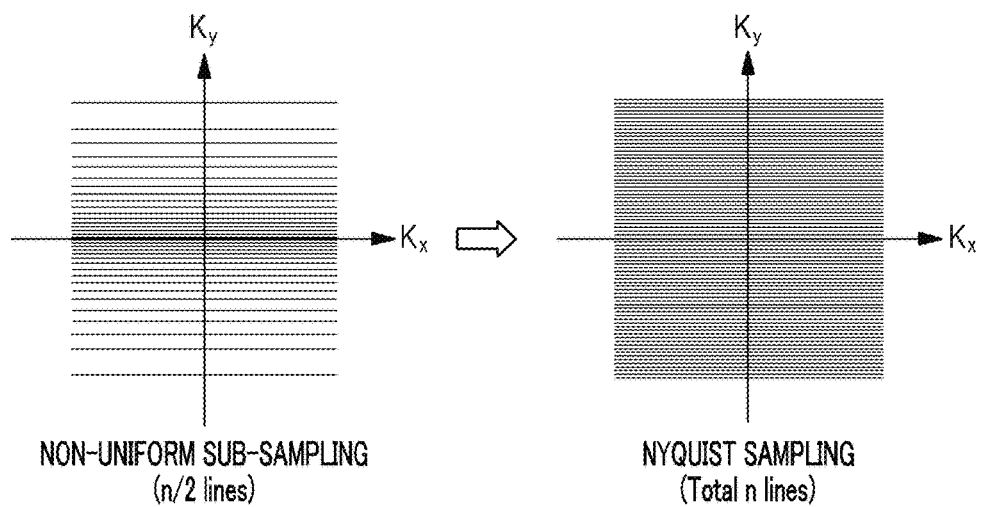
FIG. 4 is a schematic diagram illustrating the differences between sub-sampling and full sampling according to an embodiment of the present invention.

FIG. 4 is a schematic diagram illustrating the differences between sub-sampling and full sampling according to an embodiment of the present invention.

Referring to FIG. 4, the sub-sampled magnetic resonance signal 310 may be a magnetic resonance signal 310 sampled at a sampling rate lower than the Nyquist sampling rate. In addition, the sub-sampled magnetic resonance image is an image acquired by sampling a magnetic resonance signal at a sampling rate lower than the Nyquist sampling rate. Meanwhile, a full-sampled magnetic resonance image may be an image acquired by sampling k-space data at a sampling rate equal to or higher than the Nyquist sampling rate.

For example, the number of lines of the full-sampled magnetic resonance signal may be n, and the number of lines of the sub-sampled magnetic resonance signal 310 may be n/2. In this case, when the degree of reduction of sampling lines is a multiple of ½, the acceleration index of magnetic resonance imaging may be said to be 2. When the degree of reduction of sampling lines is a multiple of ⅓ or a multiple of ¼, the acceleration index may be said to be 3 or 4.

Furthermore, sub-sampling methods may be divided into uniform sub-sampling and non-uniform sub-sampling. The uniform sub-sampling may be a method of performing sampling while maintaining the constant interval of lines to be sampled. In contrast, the non-uniform sub-sampling may refer to a method of performing more sampling while narrowing the interval of lines to be sampled in a direction toward the center of sampling target data and performing less sampling while increasing the interval of the sampled line in a direction away from the center.

Meanwhile, the magnetic resonance image processing apparatus may be included in the MRI system, and may acquire input data corresponding to the sub-sampled magnetic resonance signal 310 based on the magnetic resonance signal received from an RF coil. In addition, the magnetic resonance image processing apparatus may acquire input data corresponding to the sub-sampled magnetic resonance signal 310 from at least one of an external magnetic resonance imaging machine, an external server, and a database.

Referring back to FIGS. 2 and 3, there may be performed step S210 of acquiring first k-space data 320 from the sub-sampled magnetic resonance signal 310 using a parallel imaging technique.

In this case, the parallel imaging technique is a type of image reconstruction technique for acquiring high-accuracy k-space data and/or a high-accuracy magnetic resonance image such as full-sampled k-space data and/or a magnetic resonance image from the sub-sampled magnetic resonance signal 310 and/or k-space data.

In the performance of image reconstruction according to the parallel imaging technique, known technologies, i.e., Sensitivity Profiles From an Array of Coils for Encoding and Reconstruction in Parallel (SPACE RIP), Simultaneous acquisition of spatial harmonics (SMASH), Partially Parallel Imaging With Localized Sensitivities (PILS), Generalized Autocalibrating Partially Parallel Acquisitions (GRAPPA), and Iterative Self-consistent Parallel Imaging Reconstruction (SPIRiT), may be applied without limitation as long as they can be applied to the parallel imaging technique.

After step S210, there may be performed step S220 of acquiring second k-space data 330 from the first k-space data 320 using the first artificial neural network model 500.

Figure 5:
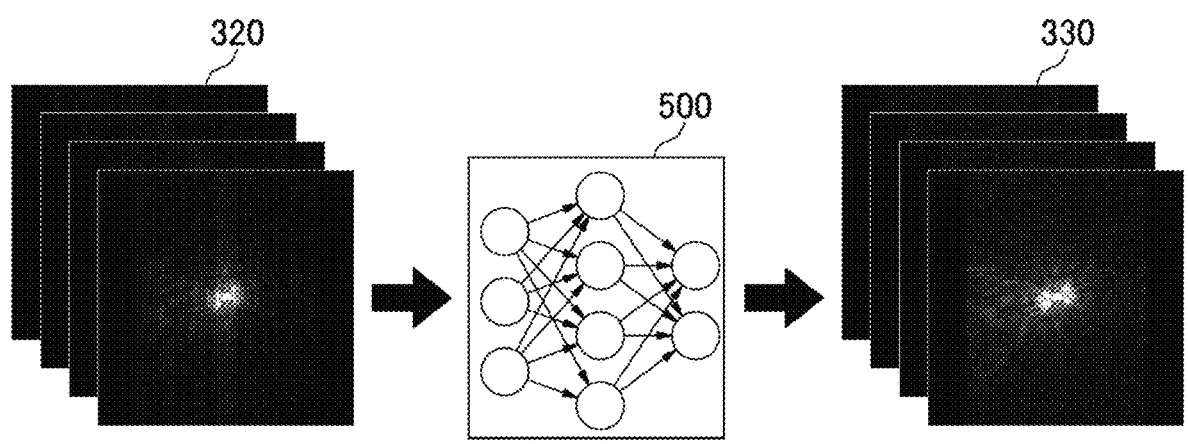
FIG. 5 is a schematic diagram showing acquiring second k-space data from first k-space data by using a first artificial neural network model according to an embodiment of the present invention.

FIG. 5 is a schematic diagram showing acquiring the second k-space data 330 from the first k-space data 320 by using a first artificial neural network model 500 according to an embodiment of the present invention.

Referring to FIG. 5, the first artificial neural network model 500 may be a set of algorithms for learning the correlation between at least one piece of sub-sampled first k-space data 320 and at least one piece of full-sampled first k-space data using statistical machine learning results. The first artificial neural network model 500 may include at least one neural network.

The neural network may include network models such as a Deep Neural Network (DNN), a Recurrent Neural Network (RNN), a Bidirectional Recurrent Deep Neural Network (BRDNN), a Multilayer Perceptron (MLP) network, and a Convolutional Neural Network (CNN), but is not limited thereto.

For example, the first artificial neural network model 500 may be a model constructed by learning the correlation between at least one piece of sub-sampled first k-space data 320 and at least one piece of full-sampled first k-space data using a neural network based on the units of the pixels of at least one sampling line stacked along a phase encoding direction Ky.

Referring to FIG. 4, the phase encoding direction Ky may be a direction extending parallel to a direction in which a sampled line is stacked in the process of sampling the magnetic resonance signal 310. In addition, a readout direction Kx may be a direction in which the sampled line extends. Meanwhile, a Kz direction may be referred to as the axial direction of the coil or a first direction Kz that is orthogonal to the phase encoding direction Ky and the readout direction Kx, which will be described later.

Meanwhile, when there are a plurality of sub-sampled magnetic resonance signals 310, pluralities of pieces of first k-space data 320 and second k-space data 330 may be acquired. In other words, when there are a plurality of RF coils for receiving the magnetic resonance signal 310, a plurality of reconstructed images generated in response to a plurality of magnetic resonance signals 310 received for respective channels become first magnetic resonance images 340.

Furthermore, the first artificial neural network model 500 may be constructed using various types of additional data in addition to the sub-sampled first k-space data 320 and the full-sampled first k-space data. For example, at least one of real data, imaginary data, magnitude data, and phase data corresponding to the first k-space data may be used as the additional data.

Meanwhile, the first magnetic resonance image 340 acquired by performing an inverse Fourier operation on the first k-space data 320 and/or the second k-space data 330 may include a multi-domain artifact.

FIG. 6 is a diagram showing a target image and a plurality of multi-domain artifact images according to the reconstruction of a magnetic resonance image. FIG. 7 is a diagram showing a plurality of multi-domain artifact images according to the reconstruction of a magnetic resonance image.

Referring to FIGS. 6 and 7, a multi-domain artifact may be generated because a magnetic resonance image is acquired using an artificial neural network. More specifically, the multi-domain artifact may be generated because k-space data, which is the basis of the magnetic resonance image, is reconstructed through an artificial neural network model in a k-space domain and the reconstructed data is converted and moved to an image domain. Meanwhile, the phase encoding direction Ky and readout direction Kx described above in the image domain may be directions corresponding to the y direction and the x direction, respectively, shown in FIG. 6(a).

The multi-domain artifact may include at least one of an aliasing artifact, a gibbs-ringing artifact, a white-dot artifact, a smoothing artifact, a texture artifact, and a hallucination artifact. In addition, when the magnetic resonance image includes a plurality of multi-domain artifacts, the individual artifacts may be arranged in the phase encoding direction.

Figure 6A:
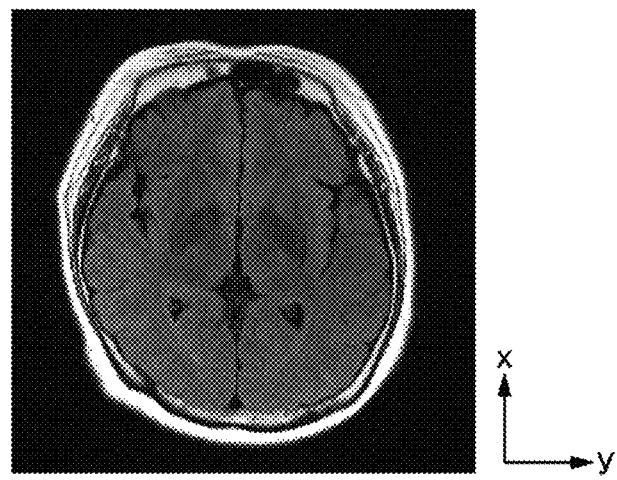
FIGS. 6A, 6B, 6C and 6D are a diagram showing a target image and a plurality of multi-domain artifact images according to the reconstruction of a magnetic resonance image.
Figure 6B:

In this case, the aliasing artifact is an artifact that appears like multiple target images overlap when compared to the target image (see FIG. 6(a)), and may be generated when data loss is severe in image reconstruction using an artificial neural network and/or when the field of view (FoV) is smaller than an object to be imaged. In this case, the target image is a magnetic resonance image reconstructed based on the full-sampled magnetic resonance signal 310.

Figure 6C:

The gibbs-ringing artifact is an artifact in which a target image appears to fluctuate at a boundary surface when compared to a target image (see FIG. 6(c)), and may be generated when k-space data reconstructed using an artificial neural network is converted and moved from the k-space domain to the image domain.

Figure 6D:
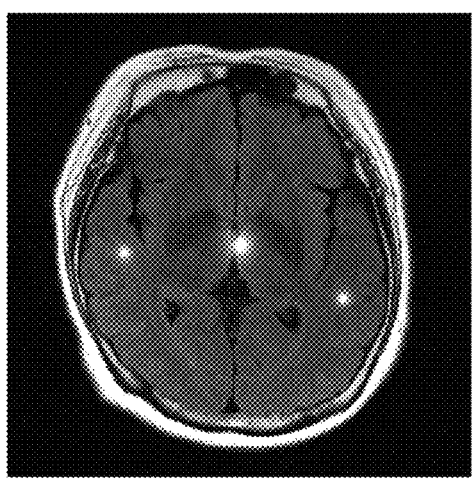

The white dot artifact is an artifact in which a white dot occurs in a part of the target image when compared to a target image (see FIG. 6(d)), and may be generated when an unnecessary bias component is generated in image reconstruction using an artificial neural network. In general, an artificial neural network generates a bias in neurons forming a part of the artificial neural network or includes an activation function to improve prediction performance. Due to the structure of such an artificial neural network, a bias may be formed in an output magnetic resonance image itself.

Figure 7A:
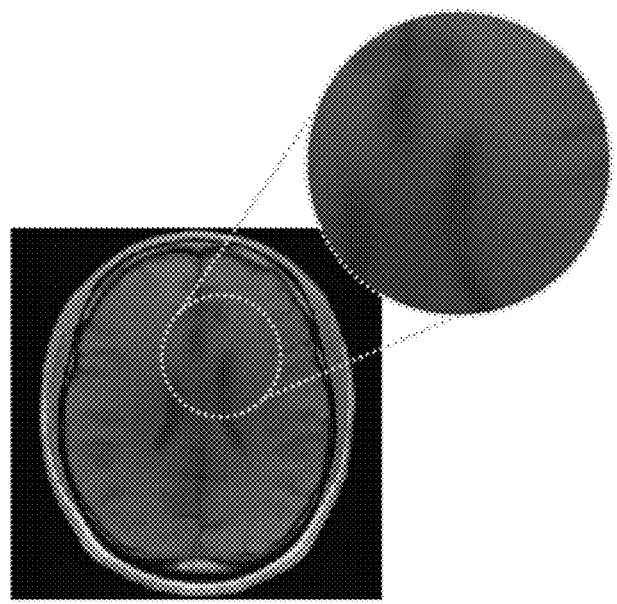
FIGS. 7A, 7B and 7C are a diagram showing a plurality of multi-domain artifact images according to the reconstruction of a magnetic resonance image.

The smoothing artifact is an artifact in which the texture and details of an image disappear (see FIG. 7(a)). The smoothing artifact is generated when the amount of information in input data is insufficient or when, in the case of an artificial neural network, the learning of learning data is incomplete or fails in the case where an artificial neural network is used for magnetic resonance image reconstruction and/or nonlinear data optimization is employed.

Figure 7B:
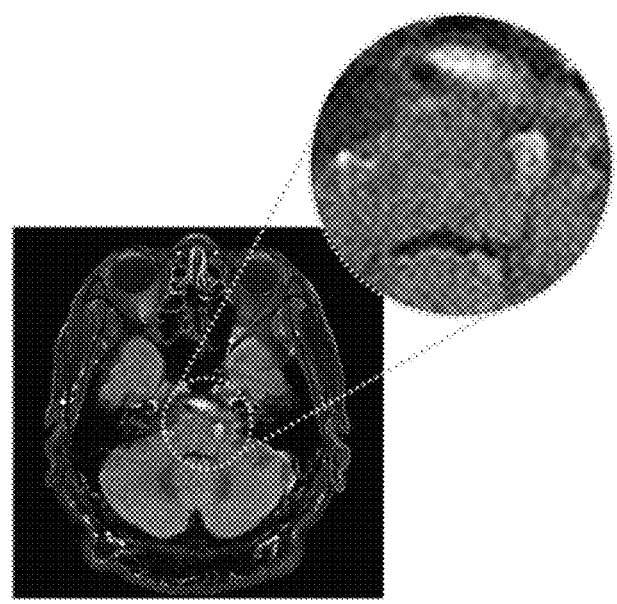

The texture artifact is an artifact in which the texture of an image appears to be changed (refer to FIG. 7(b)). For example, it can be seen that a zigzag-shaped texture that is not actually present is formed in FIG. 7(b). A first reason why a texture artifact is generated is that when an image is reconstructed from data having a low signal to noise ratio (SNR) by using an artificial neural network, the image appears to be horizontally repeated due to aliasing, in which case there are cases where this horizontal pattern remains in the reconstructed image. Second, in the case of the CNN, a sub map is learned in each convolutional layer. When the learning is wrong, the wrong texture is used upon the reconstruction of an image, resulting in the generation of a texture artifact.

Figure 7C:
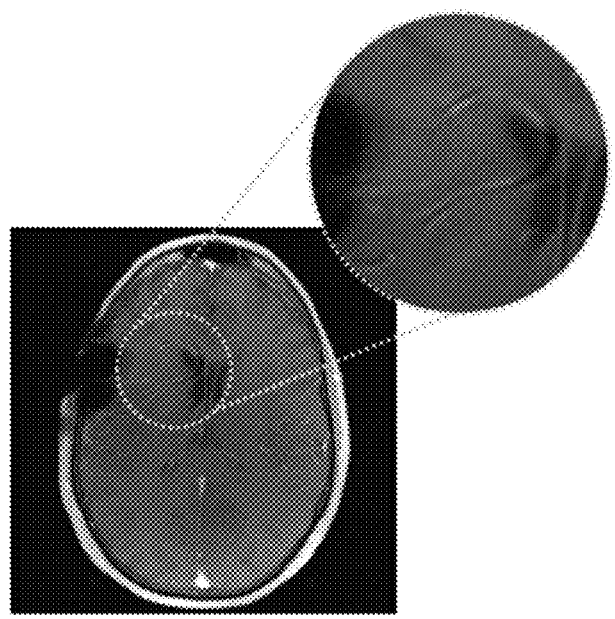

The hallucination artifact is an artifact in which a structure that is not actually present appears to be present (see FIG. 7(c)). Referring to FIG. 7(c), the structure that is rounded in the middle of the enlarged portion is similar to the shape of the blood vessel in the lower right portion of the brain image. It is a structure that is not actually present and is a shape generated by an artificial neural network. There may be various reasons for the generation of a hallucination artifact. This may be generated when the artificial neural network model determines that sub-sampled k-space data is data acquired from an object that is not actually present and then reconstructs an image.

To remove these artifacts, when the first k-space data 320 is pre-processed and input to the first artificial neural network model 500 and the second k-space data 330 output from the first artificial neural network model 500 is post-processing and input to the first artificial neural network model 500, the output first magnetic resonance image 340 may not include a multi-domain artifact.

FIG. 8 is a flowchart showing the flow of a magnetic resonance image processing method to which the pre-processing of the first k-space data 320 and the post-processing of the second k-space data 330 are applied according to an embodiment of the present invention.

Referring to FIG. 8, the pre-processing of the first k-space data 320 may be a process that is performed using a linear function-based pre-processing technique applied to the first k-space data 320 at step S221.

The linear function-based pre-processing technique is a data processing technique that is performed based on the following equation:

$$y=a*x+b$$

y: pre-processed k-space data
x: k-space data before pre-processing
a and b: coefficient In this case, the coefficients a and b included in the linear function may be calculated through an artificial neural network based on at least one of the first k-space data 320, the second k-space data 330, and the data of the first magnetic resonance image 340.

Furthermore, the second k-space data 330 may be acquired by reconstructing the pre-processed first k-space data 320 through the first artificial neural network model 500 at step S222.

Furthermore, the post-processing of the second k-space data 330 may be performed using the inverse transform function of the linear function at step S223.

After step S223, there may be performed step S230 of acquiring the first magnetic resonance image 340 from the post-processed second k-space data 330 by using an inverse Fourier (IFFT) operation. For example, GRAPPA may generate a first magnetic resonance image 340, which is a reconstructed image, by performing an inverse Fourier transform on image data in a complete k-space form.

After step S230, there may be performed step S240 of acquiring a second magnetic resonance image 350 from the first magnetic resonance image 340 using a second artificial neural network model 600.

Figure 9:
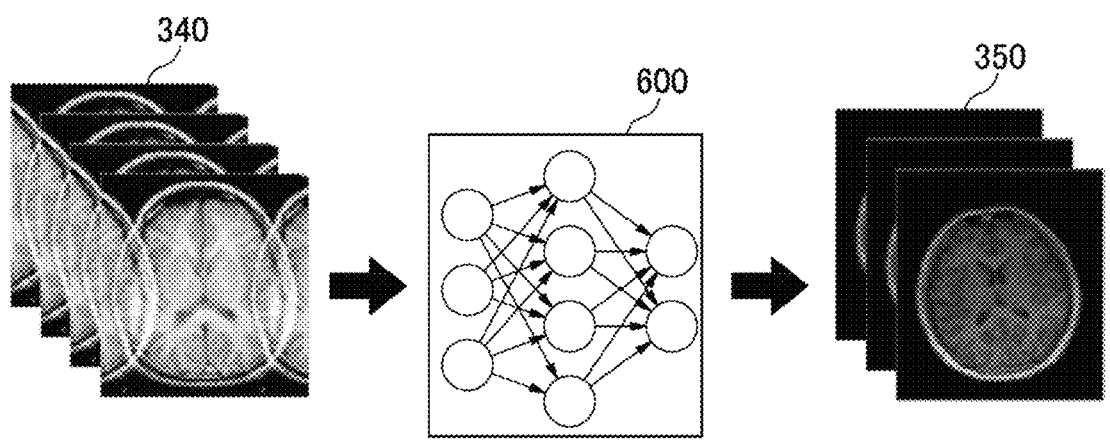
FIG. 9 is a schematic diagram showing acquiring a second magnetic resonance image from a first magnetic resonance image by using a second artificial neural network model according to an embodiment of the present invention.

FIG. 9 is a schematic diagram showing acquiring the second magnetic resonance image 350 from the first magnetic resonance image 340 by using the second artificial neural network model 600 according to an embodiment of the present invention.

Referring to FIG. 9, the second artificial neural network model 600 may be a set of algorithms for learning the correlation between at least one sub-sampled magnetic resonance image and at least one full-sampled magnetic resonance image using statistical machine learning results. The second artificial neural network model 600 may include at least one neural network. The neural network may include network models such as a Deep Neural Network (DNN), a Recurrent Neural Network (RNN), a Bidirectional Recurrent Deep Neural Network (BRDNN), a Multilayer Perceptron (MLP) network, and a Convolutional Neural Network (CNN), but is not limited thereto.

For example, the second artificial neural network model 600 may be a model constructed by learning the correlation between at least one sub-sampled magnetic resonance image and at least one full-sampled magnetic resonance image using a neural network based on the units of the pixels of at least one sampling line stacked along a phase encoding direction Ky.

Furthermore, the second artificial neural network model 600 may be constructed using various types of additional data in addition to the sub-sampled magnetic resonance image and the full-sampled magnetic resonance image. For example, at least any one of k-space data, real image data, imaginary image data, size image data, and phase image data corresponding to the first magnetic resonance image 340 may be used as the additional data.

Meanwhile, when the data of the first magnetic resonance image 340 is input to the second artificial neural network model 600, the acquired second magnetic resonance image 350 may include a multi-domain artifact. The multi-domain artifact may be generated when an artificial neural network model is applied to a magnetic resonance image.

In this case, the multi-domain artifact may include at least one of an aliasing artifact, a gibbs-ringing artifact, a white-dot artifact, a smoothing artifact, a texture artifact, and a hallucination artifact. When the second magnetic resonance image 350 includes a plurality of multi-domain artifacts, the individual artifacts may be arranged in the phase encoding direction.

However, when the data of the first magnetic resonance image 340 is pre-processed and input to the second artificial neural network model 600 and the second magnetic resonance image 350 output from the second artificial neural network model 600 is post-processed, the post-processed second magnetic resonance image 350 may not include a multi-domain artifact.

More specifically, the pre-processing of the data of the first magnetic resonance image 340 may be a process that is performed using a linear function-based pre-processing technique applied to the data of the first magnetic resonance image 340. The post-processing of the second magnetic resonance image 350 may be a process that is performed using the inverse transform function of the linear function. In this case, the linear function-based pre-processing technique may be a method using an equation identical or similar to the equation applied to the k-space domain described above.

Furthermore, the coefficients included in the linear function may be calculated based on at least one of the first k-space data 320, the second k-space data 330, and the data of the first magnetic resonance image 340. It may be different from the coefficients of the linear function-based technique applied to the k-space domain described above.

Furthermore, at step S240 of acquiring the second magnetic resonance image 350, there may be performed the process of forming a set of first magnetic resonance image 340 by applying sub maps to the first magnetic resonance image 340.

Figure 11:
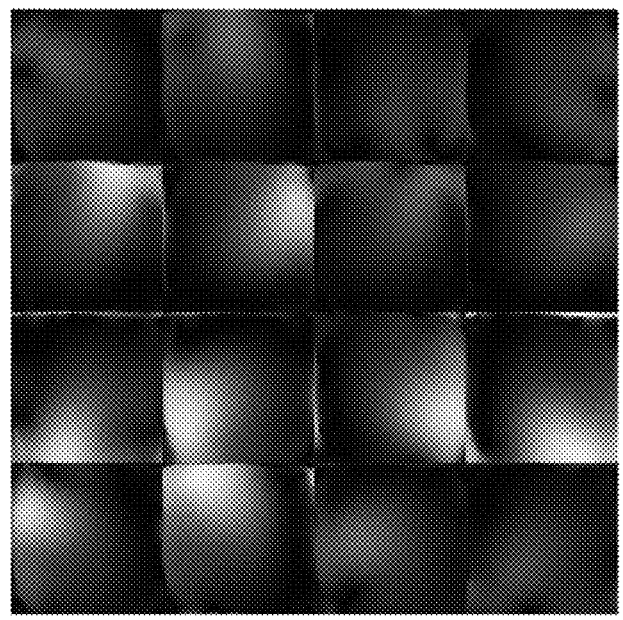
FIG. 11 is a diagram illustrating a coil sensitivity map among a plurality of sub maps according to an embodiment of the present invention.
Figure 12:
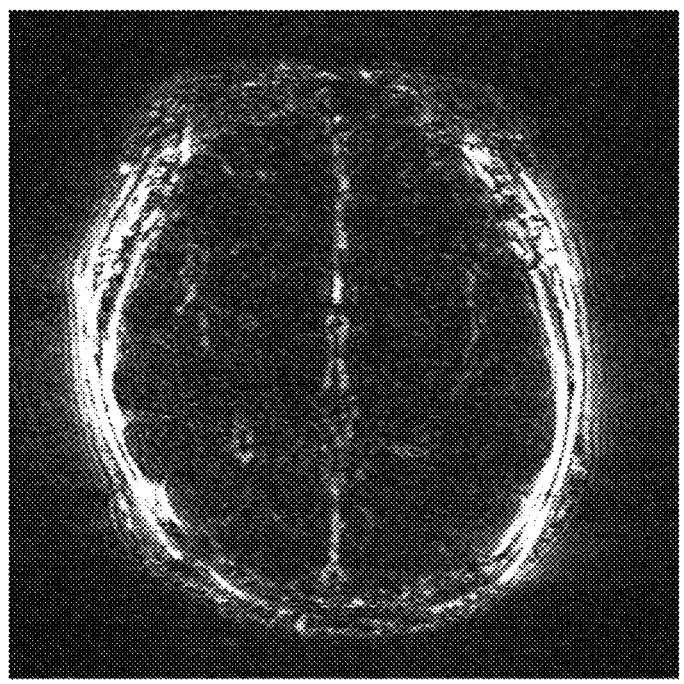
FIG. 12 is a diagram illustrating a residual map among a plurality of sub maps according to an embodiment of the present invention.
Figure 13:
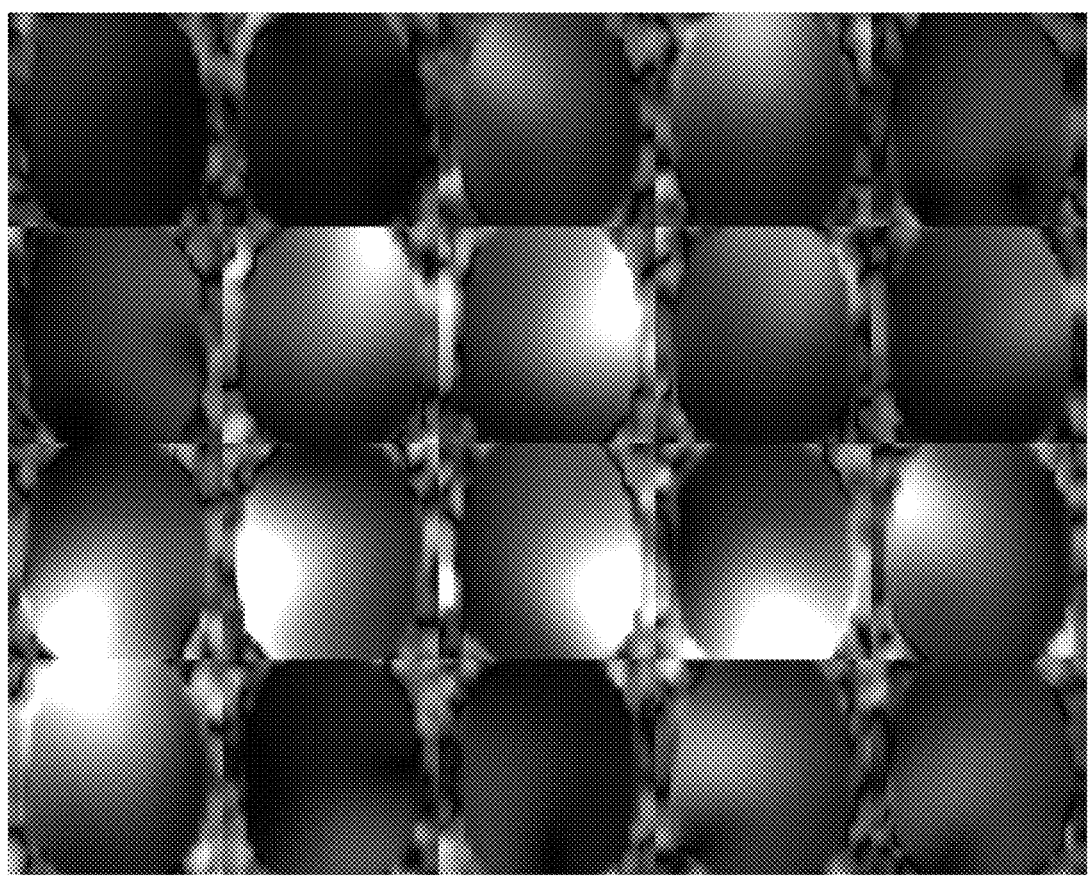
FIG. 13 is a diagram illustrating an adaptive combine map among a plurality of sub maps according to an embodiment of the present invention.

FIG. 10 is a diagram illustrating a noise pattern map among a plurality of sub maps according to an embodiment of the present invention. FIG. 11 is a diagram illustrating a coil sensitivity map among a plurality of sub maps according to an embodiment of the present invention. FIG. 12 is a diagram illustrating a residual map among a plurality of sub maps according to an embodiment of the present invention. FIG. 13 is a diagram illustrating an adaptive combine map among a plurality of sub maps according to an embodiment of the present invention.

Referring to FIGS. 10 to 13, each of the sub maps may include at least any one a noise pattern map NP, a coil sensitivity map, a residual map, and an adaptive combine map.

Referring to FIG. 10, the noise pattern map NP may be an image that is divided and displayed by applying a weight based on the degree of occurrence of noise according to each part of an object in a reconstructed image. As an example, the noise pattern map NP may be a pattern map that is generated based on the noise detected by comparing an image reconstructed by applying a general artificial neural network model to a sub-sampled magnetic resonance image with a full sampled magnetic resonance image.

More specifically, referring to FIG. 10(a), when a contrast image 930 acquired by contrasting a reconstructed image 920 output by using a sub-sampled magnetic resonance image 910 as an input of an artificial neural network model and a full sampled magnetic resonance image 930 is observed, a portion PC (Poor-Conditioned) where a lot of noise has occurred in the form of an ellipse that is erected in the center of the image may be viewed. A portion where a relatively small amount of noise has occurred may be viewed. A map that is generated based on the differences in the occurrence of noise for the respective portions of an object is the noise pattern map NP.

Figure 10B:
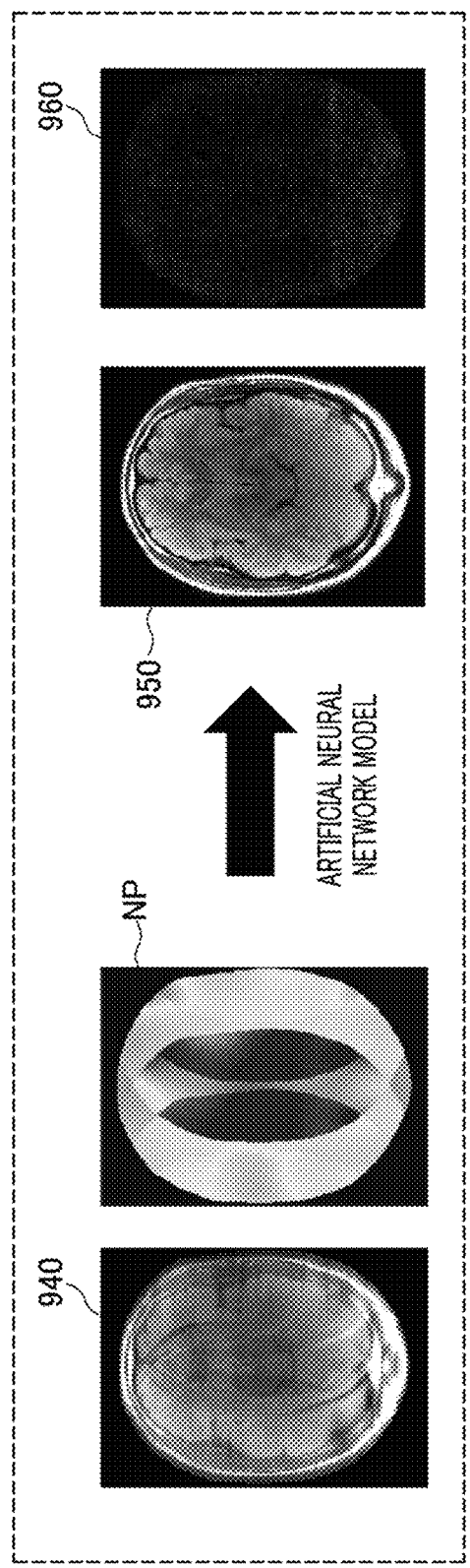

Referring to FIG. 10(b), it can be seen that when a contrast image 960 obtained by contrasting the reconstructed image 950 output by using the sub-sampled magnetic resonance image 940 and the noise pattern map (NP) as inputs of the artificial neural network model with the full-sampled magnetic resonance image is observed, noise is reduced throughout the overall image.

Referring to FIG. 11, the coil sensitivity map is used to compensate for magnetic resonance image data acquired differently according to the characteristics (shape, size, location, distance to an object, etc.) of each coil when photographing is performed using a plurality of coils and a magnetic resonance image output from the magnetic resonance image data.

For example, in the case where an object is photographed using 16 coils, when a coil sensitivity map corresponding to each of the 16 coils is applied to a magnetic resonance image data acquired from the corresponding coil and a final magnetic resonance image is output, an image having improved quality may be acquired.

Referring to FIG. 12, the residual map may be an image including difference value data between a target image and a reconstructed image. For example, when there is a reconstructed image of the first magnetic resonance image 340 generated based on sub-sampled magnetic resonance data input to the second artificial neural network model 600 and there is a target image generated based on full-sampled magnetic resonance data, a residual map may be generated based on data obtained by removing the reconstructed image from the target image.

Referring to FIG. 13, the adaptive combine map may be said to be a map having coefficient information allocated to each pixel required when multi-channel image domain data is combined into an image. For example, when the adaptive combine map of an i-th coil is $C_i^*(x)$ and an image is $m_i(x)$, a combined image $m(x)$ may be expressed as the equation $m(x)=\Sigma_i C_i^*(x)*m_i(x)$.

Figure 14:
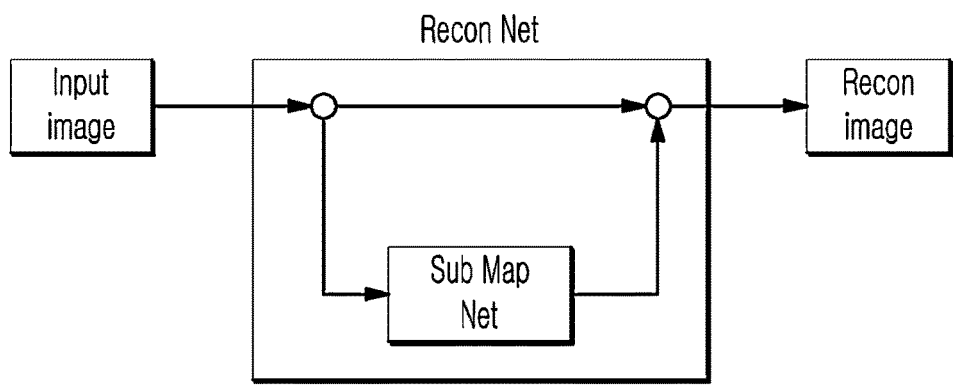
FIG. 14 is a schematic diagram showing the structure of a second artificial neural network model including a sub map generation artificial neural network module according to an embodiment of the present invention.

FIG. 14 is a schematic diagram showing the structure of a second artificial neural network model 600 including a sub map generation artificial neural network module according to an embodiment of the present invention.

Referring to FIG. 14, the sub map may be a map that is generated using a sub map generation artificial neural network module (Sub Map Net). The sub map generation artificial neural network module may be a module that is trained based on the first magnetic resonance image 340, the second magnetic resonance image 350, and the target image. For example, when the first magnetic resonance image 340 (Input image) is input to the second artificial neural network model 600, it is input to a reconstruction artificial neural network module (Recon Net) and the sub map generation artificial neural network module (Sub Map Net). The output value of the auxiliary map generation artificial neural network module may be used as a second input to the reconstructed artificial neural network module in order to be subsidiarily used for the reconstruction of the first magnetic resonance image 340 of the reconstructed artificial neural network module.

Furthermore, the sub map may be generated using a mathematical model based on at least one of the first k-space data and the first magnetic resonance image. Generally, the sub map is generated using a function M: $m_i \rightarrow C_i$ that uses multi-channel k-space data $m_i(x)$ as an input and outputs a sub map $C_i(x)$. However, since the mathematical model does not use an artificial neural network, the parameter that is learned in an artificial intelligence manner is not included in the function M as a coefficient.

For example, the coil sensitivity map may be generated through an ESPIRiT algorithm. The ESPIRiT algorithm uses an equation that satisfies a null-space condition based on the assumption that there is a correlation between coils for each pixel of a magnetic resonance image. Sensitivity information may be acquired for each pixel of the magnetic resonance image. The noise pattern map may be generated by repeating the process of randomly applying noise to k-space data and then reconstructing an image by using a construction algorithm, and comparing the reconstructed image with an image to which noise is not applied. The residual map may be generated based on the differences between sub-sampled magnetic resonance image data and full-sampled magnetic resonance image data. The adaptive combine map may be obtained by synthesizing the characteristic coefficients of respective coils that maximize signal-to-noise ratios for respective pixels of the magnetic resonance image.

Figure 15:
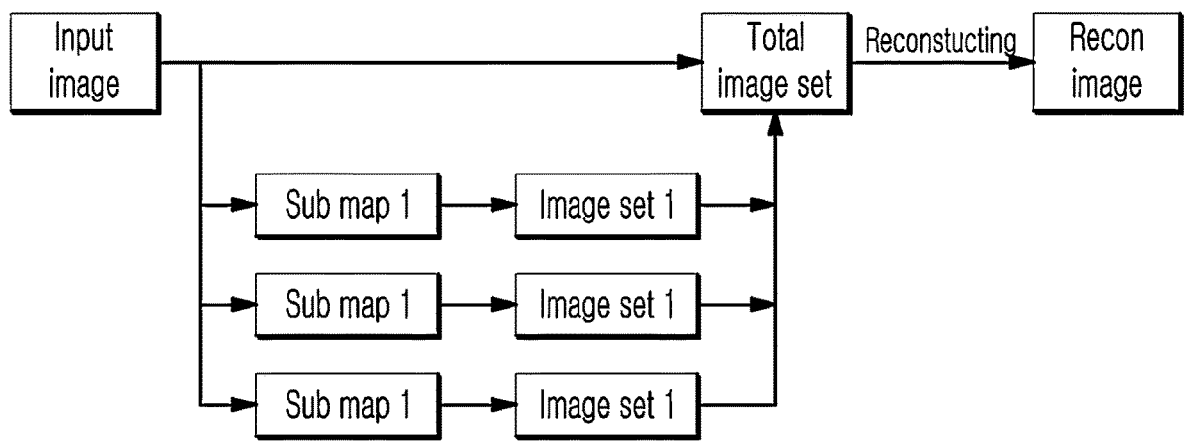
FIG. 15 is a schematic diagram showing forming first magnetic resonance image sets based on sub maps according to an embodiment of the present invention.

FIG. 15 is a schematic diagram showing forming first magnetic resonance image (340) sets based on sub maps according to an embodiment of the present invention.

Referring to FIG. 15, a plurality of sub maps are provided, and a first magnetic resonance image 340 may be formed as a plurality of first magnetic resonance image (340) sets through combination based on the plurality of sub maps. For example, at least one of a noise pattern map, a coil sensitivity map, a residual map, and an adaptive combine map may include a plurality of maps. In other words, when three coil sensitivity maps having different characteristics are generated, the first magnetic resonance image 340 is combined with coil sensitivity map 1 (Sub map 1), coil sensitivity map 2 (Sub map 2), and coil sensitivity map 3 (Sub map 3) to form a first image set (Image set 1), a second image set (Image set 2), and a third image set (Image set 1), and finally, the first image set (Image set 1), the second image set (Image set 2), and the third image set (Image set 1) together with the first magnetic resonance image 340 are input to an image reconstruction artificial neural network (Recon Net) to generate a reconstructed image (Recon image).

The plurality of first magnetic resonance image (340) sets may be combined with each other and input to the second artificial neural network model 600. For example, the first image set, the second image set, and the third image set may be combined with the first magnetic resonance image 340 and input to the second artificial neural network model 600. Alternatively, the first image set, the second image set, and the third image set may be combined with each other and input to the second artificial neural network model 600.

Meanwhile, there may be performed a process in which sub maps are applied to the first k-space data 320 to form a plurality of first k-space data (320) sets at the step of acquiring the second k-space data 330 in the k-space domain, as in the image domain.

The sub maps may include at least one of coil sensitivity maps, noise pattern maps, residual maps, and adaptive combine maps. The sub maps are maps that are generated using the sub map generation artificial neural network module, and the sub map generation artificial neural network module may be a module that is trained based on the first magnetic resonance image 340 and the second magnetic resonance image 350. A plurality of sub maps are provided, and the first k-space data 320 may be formed as a plurality of first k-space data (320) sets to which a plurality of sub maps are respectively applied. The plurality of first magnetic resonance image (340) sets may be combined with each other and input to the second artificial neural network model 600.

Figure 16:
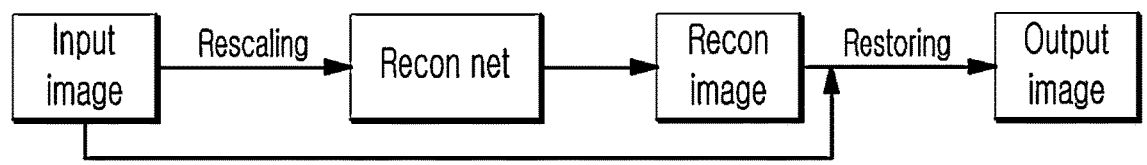
FIG. 16 is a schematic diagram showing the magnetic resonance image reconstruction process of a magnetic resonance image reconstruction method according to an embodiment of the present invention.

FIG. 16 is a schematic diagram showing the magnetic resonance image reconstruction process of a magnetic resonance image reconstruction method according to an embodiment of the present invention.

Referring to FIG. 16, the second artificial neural network model 600 may be a model that is trained on difference values (hereinafter 'full-sub difference values') between a magnetic resonance image acquired from k-space data calculated based on the sub-sampled magnetic resonance signal 310 and a magnetic resonance image acquired from k-space data calculated based on the full-sampled magnetic resonance signal 310.

Furthermore, the second artificial neural network model 600 may be a model that calculates full-sub difference values from the first magnetic resonance image 340, applies the full-sub difference values to the first magnetic resonance image 340, and then outputs the second magnetic resonance image 350.

In brief, when an image is reconstructed by adding full-sub difference values, calculated in advance through deep learning, to the first magnetic resonance image 340, a reconstructed image having considerably high similarity to a target image may be acquired.

Furthermore, the first magnetic resonance image 340 may be pre-processed for rescaling when it is input to the second artificial neural network model 600, and may be post-processed for restoring when it is output from the second artificial neural network model 600.

Figure 17:
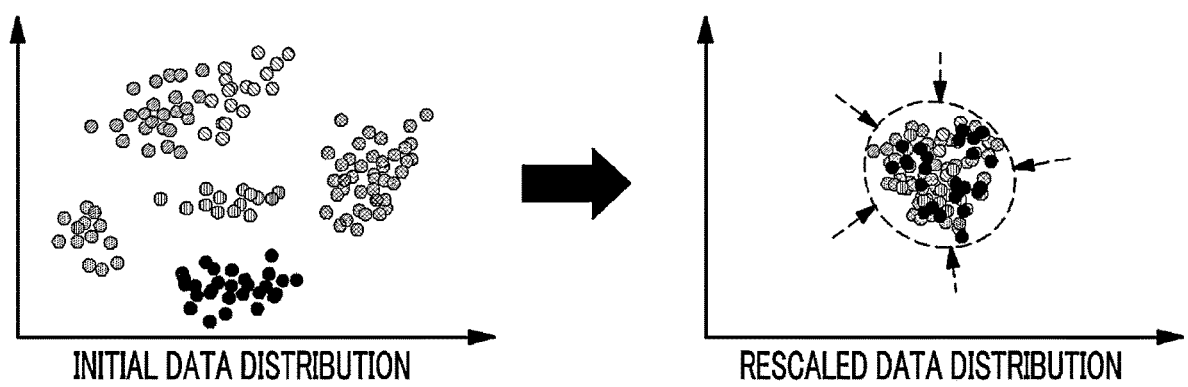
FIG. 17 is a diagram illustrating the rescaling of full-sub difference values according to an embodiment of the present invention.

FIG. 17 is a diagram illustrating the rescaling of full-sub difference values according to an embodiment of the present invention.

Referring to FIG. 17, the rescaling generally refers to the process of processing data, generated using an artificial neural network model, into a form and scale optimized for training data or input data. For example, the rescaling may be the process of processing data into a form having a low dispersion when the data is distributed over a wide range without rules or is distributed in a form in which data having similar characteristics are gathered according to the characteristics of a plurality of sets. The rescaling may include at least anyone of the normalization and standardization of data.

In this case, the normalization is the process of removing an unnecessary influence from data and allowing the data to be compared for a specific purpose. The normalization refers to the formulation of the principle of excluding redundancy by writing and entering one piece of data into one attribute in order to remove an exception from an operation or relational model applied to a numerical quantity.

Furthermore, the standardization refers to a process in which data is multiplied by a predetermined coefficient to fall within a predetermined range, or an exponent part is changed such that a significant digit is placed at the left end of a mantissa part in the floating-point representation of data.

Furthermore, the restoring may be the process that is performed by inversely transforming the data of the first magnetic resonance image 340 rescaled by normalization or standardization or by applying at least one of the first k-space data 320, the data of the first magnetic resonance image 340, and the data of the rescaled first magnetic resonance image 340 to the full-sub difference values.

In this case, the applying refers to reflecting the characteristics of the first k-space data 320 or first magnetic resonance image 340 to the full-sub difference values. It may be performed in any form as long as the above-described restoring function can be performed. For example, there may be performed an operation including a method of adding, subtracting, multiplying, or dividing the first k-space data 320 or the data of the first magnetic resonance image 340 to, from, by, and by the full-sub difference values, or a combination of these four fundamental arithmetic operations, and there may be performed an operation for reflecting the characteristic values, common values, or representative values of the first k-space data 320 or data of the first magnetic resonance image 340 to the full-sub difference values. Accordingly, the characteristics of a magnetic resonance image reconstructed by applying rescaling may be aligned to correspond to input data.

Meanwhile, in the process of acquiring the second k-space data 330 from the above-described first k-space data 320 by using the first artificial neural network model 500, the first artificial neural network model 500 may be a model that is trained on the difference values between data based on a magnetic resonance image acquired from k-space data calculated based on the sub-sampled magnetic resonance signal 310 and data based on a magnetic resonance image acquired from k-space data calculated based on the full-sampled magnetic resonance signal 310.

In this case, the first artificial neural network model 500 may be a model that calculates only full-sub difference values from the first k-space data 320, applies the difference values to the first k-space data 320, and then outputs the second k-space data 330.

The first k-space data 320 may be pre-processed for rescaling when it is input to the first artificial neural network model 500, and may be post-processed for restoring when it is output from the first artificial neural network model 500. In this case, the 'rescaling' may include at least any one of normalization and standardization. The 'restoring' may be a process that is performed by applying at least one of the first k-space data 320, the data of the first magnetic resonance image 340, and the data of a rescaled first magnetic resonance image to the full-sub difference values.

Meanwhile, in an embodiment, the magnetic resonance image processing apparatus may construct the above-described first artificial neural network model 500 and second artificial neural network model 600 in itself. In another embodiment, the magnetic resonance image processing apparatus may obtain the first artificial neural network model 500 and the second artificial neural network model 600, constructed in an external server or an external device, from the external server or the external device. In addition, the magnetic resonance image processing apparatus acquires the second magnetic resonance image 350, which is a reconstructed image of a sub-sampled magnetic resonance image, based on the first artificial neural network model 500 and the second artificial neural network model 600 using a neural network, thereby achieving the purposes of accelerating image acquisition speed and improving image quality.

In this case, the acquired second magnetic resonance image 350 may be provided to a user terminal and used for the diagnosis of a lesion region of a patient. Meanwhile, there may be performed an additional magnetic resonance image processing step for increasing the accuracy of the second magnetic resonance image 350.

For example, after step S240, there may be performed the step of acquiring third k-space data from the second magnetic resonance image 350 by using a Fourier operation.

The step of acquiring the third k-space data may include the step of acquiring a plurality of second magnetic resonance images 350 by decombining the second magnetic resonance image 350. The second magnetic resonance image 350 may be decombined based on individual pieces of sub map information and generated as a plurality of magnetic resonance images.

Furthermore, the step of acquiring obtaining the third k-space data may include the step of acquiring third k-space data from the second magnetic resonance image 350 by using a Fourier operation. Accordingly, a plurality of pieces of third k-space data may be acquired by applying Fourier transform to the plurality of magnetic resonance images generated from the second magnetic resonance image 350.

Thereafter, there may be performed the step of acquiring fourth k-space data from the third k-space data by using a parallel operation technique. In this case, the parallel operation technique may be a parallel operation technique capable of obtaining corrected full-sampled fourth k-space data from full-sampled third k-space data. The above-described SPIRiT technique may be used as the parallel operation technique applied herein.

For example, as GRAPPA is used as the first parallel operation technique and SPIRiT is used as the second parallel operation technique, an effect arises in that a reconstructed image having higher accuracy is acquired in the process of acquiring a reconstructed image.

Thereafter, there may be performed the step of acquiring fifth k-space data from the fourth k-space data by using an artificial neural network model. In this case, an artificial neural network model that is the same as the above-described first artificial neural network model 500 may be used as the artificial neural network model. Alternatively, an artificial neural network model that is different from the first artificial neural network model 500 may be used as the artificial neural network model.

Thereafter, based on fifth k-space data, the above-described steps S230 to S240 are repeatedly performed as a set, and finally, a magnetic resonance image (hereinafter an 'output magnetic resonance image') may be output. In addition, the output magnetic resonance image may be provided to a user terminal and used as an image for the diagnosis of a lesion region of a patient.

The magnetic resonance image processing apparatus and method according to the above-described embodiments of the present invention have the effects of shortening the time required for capturing a magnetic resonance image via a magnetic resonance imaging machine and generating a magnetic resonance image having high accuracy through image reconstruction.

Furthermore, the magnetic resonance image processing apparatus and method according to the above-described embodiments of the present invention are configured to acquire a plurality of magnetic resonance images, to generate input data by pre-processing the plurality of magnetic resonance images, and to provide an output magnetic resonance image having high accuracy reconstructed by using the first artificial neural network model 500 and the second artificial neural network model 600, thereby providing the effect of facilitating the diagnosis of a lesion region of a patient.

Meanwhile, the magnetic resonance image processing method according to an embodiment of the present invention may be implemented in the form of a storage medium including instructions executable by a computer, such as a program module executed by a computer. Computer-readable media can be any available media that can be accessed by a computer, and includes both volatile and nonvolatile media and removable and non-removable media. Furthermore, the computer-readable media may include computer storage media. The computer storage media include both volatile and nonvolatile media and removable and non-removable media implemented using any method or technology for the storage of information such as computer-readable instructions, data structures, program modules or other data. Although the method and system of the present invention have been described in connection with the specific embodiments, some or all of their components or steps may be implemented using a computer system having a general-purpose hardware architecture.

The above description is merely illustrative of the technical spirit of the present invention, and those of ordinary skill in the art to which the present invention pertains may make various modifications and alterations without departing from the essential features of the present invention. Accordingly, the embodiments disclosed in the present invention are not intended to limit the technical spirit of the present invention but are intended to describe the technical spirit of the present invention, and the scope of the technical spirit of the present invention is not limited by these embodiments. The scope of protection of the present invention should be interpreted by the following claims, and all technical spirits falling within the scope equivalent thereto should be interpreted as being included in the scope of the present invention.

What is claimed is:

1. A magnetic resonance image processing method that is performed by a magnetic resonance image processing apparatus, the magnetic resonance image processing method comprising:

acquiring first k-space data calculated based on a sub-sampled magnetic resonance signal;

acquiring second k-space data from the first k-space data by using a first artificial neural network model; and acquiring a first magnetic resonance image from the second k-space data by using an inverse Fourier operation, wherein when the first k-space data is input to the first artificial neural network model, the acquired first magnetic resonance image includes a multi-domain artifact, and the multi-domain artifact is generated when an artificial neural network model is applied to k-space data, wherein the multi-domain artifact includes a white-dot artifact, and wherein the white-dot artifact is generated when a bias is formed in the output image due to the structure of such an artificial neural network, which includes a bias in the neurons forming the artificial neural network or an activation function.

2. The magnetic resonance image processing method of claim 1, further comprising acquiring a second magnetic resonance image from data of the first magnetic resonance image by using a second artificial neural network model.

3. The magnetic resonance image processing method of claim 1, wherein the multi-domain artifact includes at least any one of an aliasing artifact, a gibbs-ringing artifact, a smoothing artifact, a texture artifact, and a hallucination artifact.

4. The magnetic resonance image processing method of claim 1, wherein when the first magnetic resonance image includes a plurality of multi-domain artifacts, the individual artifacts are arranged in a phase encoding direction.

5. The magnetic resonance image processing method of claim 1, wherein when the first k-space data is pre-processed and input to the first artificial neural network model and the second k-space data output from the first artificial neural network model is post-processed,
the first magnetic resonance image acquired from the post-processed second k-space data does not include a multi-domain artifact.

6. The magnetic resonance image processing method of claim 5, wherein the first k-space data is pre-processed using a linear function-based pre-processing technique applied to the first k-space data.

7. The magnetic resonance image processing method of claim 6, wherein the first magnetic resonance image is post-processed using an inverse transform function of the linear function.

8. The magnetic resonance image processing method of claim 6, wherein coefficients included in the linear function are calculated based on at least any one of the first k-space data, the second k-space data, and data of the first magnetic resonance image.

9. A magnetic resonance image processing method that is performed by a magnetic resonance image processing apparatus, the magnetic resonance image processing method comprising:
acquiring a second magnetic resonance image from data of a first magnetic resonance image by using a second artificial neural network model,
wherein when the data of the first magnetic resonance image is input to the second artificial neural network model, the acquired second magnetic resonance image includes a multi-domain artifact, and the multi-domain artifact is generated when an artificial neural network model is applied to magnetic resonance image,
wherein the multi-domain artifact includes a white-dot artifact, and
wherein the white-dot artifact is generated when a bias is formed in the output image due to the structure of such an artificial neural network, which includes a bias in the neurons forming the artificial neural network or an activation function.

10. The magnetic resonance image processing method of claim 9, wherein the multi-domain artifact includes at least any one of an aliasing artifact, a gibbs-ringing artifact, a smoothing artifact, a texture artifact, and a hallucination artifact.

11. The magnetic resonance image processing method of claim 9, wherein when the second magnetic resonance image includes a plurality of multi-domain artifacts, the individual artifacts are arranged in a phase encoding direction.

12. The magnetic resonance image processing method of claim 9, wherein when data of the first magnetic resonance image is pre-processed and input to the second artificial neural network model and the second magnetic resonance image output from the second artificial neural network model is post-processed,
the post-processed second magnetic resonance image does not include a multi-domain artifact.

13. The magnetic resonance image processing method of claim 12, wherein the data of the first magnetic resonance image is pre-processed using a linear function-based pre-processing technique applied to the data of the first magnetic resonance image.

14. The magnetic resonance image processing method of claim 13, wherein the second magnetic resonance image is post-processed using an inverse transform function of the linear function.

15. The magnetic resonance image processing method of claim 13, wherein coefficients included in the linear function are calculated based on at least any one of the first k-space data, the second k-space data, and the data of the first magnetic resonance image.

16. A magnetic resonance image processing apparatus for performing a magnetic resonance image processing method, the magnetic resonance image processing apparatus comprising:
memory configured such that a magnetic resonance image processing program is stored therein; and
a processor configured to execute the program;
wherein the processor, in response to execution of the program, acquires a second magnetic resonance image from data of the first magnetic resonance image by using a second artificial neural network model; and
wherein when the first magnetic resonance image data is input to the second artificial neural network model, the acquired second magnetic resonance image includes a multi-domain artifact, and the multi-domain artifact is generated when an artificial neural network model is applied to magnetic resonance image,
wherein the multi-domain artifact includes a white-dot artifact, and
wherein the white-dot artifact is generated when a bias is formed in the output image due to the structure of such an artificial neural network, which includes a bias in the neurons forming the artificial neural network or an activation function.

* * * * *